United States Patent
Adams et al.

(10) Patent No.: US 11,603,889 B2
(45) Date of Patent: Mar. 14, 2023

(54) COVER FOR ROTATABLE SHAFT OF GAS TURBINE ENGINE

(71) Applicant: United Technologies Corporation, Farmington, CT (US)

(72) Inventors: James D. Adams, Bolton, CT (US); Zhijun Zheng, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 965 days.

(21) Appl. No.: 16/420,341

(22) Filed: May 23, 2019

(65) Prior Publication Data

US 2020/0370445 A1    Nov. 26, 2020

(51) Int. Cl.
F02C 7/18    (2006.01)
F16D 3/84    (2006.01)

(52) U.S. Cl.
CPC .............. F16D 3/84 (2013.01); F02C 7/18 (2013.01); *F05D 2240/61* (2013.01); *F16D 2300/26* (2013.01); *Y10T 137/9247* (2015.04)

(58) Field of Classification Search
CPC .... F16D 3/84; F16D 2300/26; F05D 2240/61; Y10T 137/9247; F02C 7/18
USPC ............................... 464/17; 55/409; 415/115
See application file for complete search history.

(56) References Cited

U.S. PATENT DOCUMENTS

| | | | |
|---|---|---|---|
| 2,818,047 A * | 12/1957 | Powell | F01M 13/04 |
| | | | 55/409 |
| 3,378,104 A | 4/1968 | Venable | |
| 4,687,585 A * | 8/1987 | Ramshaw | B01D 45/14 |
| 4,987,795 A | 1/1991 | Nguyen | |
| 8,821,332 B2 * | 9/2014 | Kawamura | F16H 57/027 |
| | | | 464/17 |
| 9,611,897 B2 * | 4/2017 | Edwards | F16D 3/223 |
| 2013/0051975 A1 | 2/2013 | Makulec et al. | |

FOREIGN PATENT DOCUMENTS

| | | |
|---|---|---|
| EP | 2463489 A1 | 6/2012 |
| FR | 64.788 * | 12/1955 |
| GB | 848864 A | 9/1960 |
| GB | 972907 A | 10/1964 |
| SU | 1689663 A1 * | 11/1991 |

OTHER PUBLICATIONS

Extended European Search Report for European Application No. 20172537.1, completed Sep. 9, 2020.

* cited by examiner

*Primary Examiner* — Greg Binda
(74) *Attorney, Agent, or Firm* — Carlson, Gaskey & Olds, P.C.

(57) ABSTRACT

A gas turbine engine according to an exemplary aspect of the present disclosure includes, among other things, a rotatable shaft and a cover substantially covering an end of the rotatable shaft. The cover includes a passageway fluidly coupled from outside the shaft to inside the shaft. The cover further includes a fin configured to prevent oil from entering the passageway.

4 Claims, 3 Drawing Sheets

COVER FOR ROTATABLE SHAFT OF GAS TURBINE ENGINE

BACKGROUND

A gas turbine engine typically includes a fan section, a compressor section, a combustor section, and a turbine section. Air entering the compressor section is compressed and delivered into the combustor section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

A gas turbine engine also includes bearings that support rotatable shafts. The bearings require lubricant. During operation of the engine, the lubricant flows through the rotatable shafts to reach the bearings.

SUMMARY

A gas turbine engine according to an exemplary aspect of the present disclosure includes, among other things, a rotatable shaft and a cover substantially covering an end of the rotatable shaft. The cover includes a passageway fluidly coupled from outside the rotatable shaft to inside the rotatable shaft. The cover further includes a fin configured to prevent oil from entering the passageway.

In a further non-limiting embodiment of the foregoing gas turbine engine, the cover includes a wall covering substantially the entire end of the rotatable shaft.

In a further non-limiting embodiment of any of the foregoing gas turbine engines, the wall includes an outer surface facing outside the rotatable shaft and an inner surface facing inside the rotatable shaft, and the cover includes a hub projecting from the inner surface of the wall.

In a further non-limiting embodiment of any of the foregoing gas turbine engines, the hub is concentric with an engine central longitudinal axis.

In a further non-limiting embodiment of any of the foregoing gas turbine engines, the passageway includes an axial section extending along an engine central longitudinal axis from the outer surface to a location within the hub.

In a further non-limiting embodiment of any of the foregoing gas turbine engines, the passageway includes a plurality of radial sections extending in a direction substantially perpendicular to the engine central longitudinal axis between the axial section and an outer diameter of the hub.

In a further non-limiting embodiment of any of the foregoing gas turbine engines, the outer diameter of the hub provides the fin, and the outer diameter of the hub adjacent the fin has a greater radial dimension than the outer diameter of the hub adjacent the plurality of radial sections.

In a further non-limiting embodiment of any of the foregoing gas turbine engines, the fin is axially between the plurality of radial sections and the inner surface of the wall.

In a further non-limiting embodiment of any of the foregoing gas turbine engines, the fin is a first fin and the hub further includes a second fin, and the radial sections are axially between the first and second fins.

In a further non-limiting embodiment of any of the foregoing gas turbine engines, the outer diameter of the hub provides a first channel between the first fin and the inner surface of the wall and a second channel between the first and second fins.

In a further non-limiting embodiment of any of the foregoing gas turbine engines, the first and second channels are substantially U-shaped.

In a further non-limiting embodiment of any of the foregoing gas turbine engines, centerlines of the radial sections are concentric with a centerline of the second channel.

In a further non-limiting embodiment of any of the foregoing gas turbine engines, a minimum radial dimension of the outer diameter of the hub is on the centerline of the second channel.

In a further non-limiting embodiment of any of the foregoing gas turbine engines, the second channel includes a raised center section such that a minimum radial dimension of the outer diameter of the hub is spaced-apart from the centerline of the second channel.

In a further non-limiting embodiment of any of the foregoing gas turbine engines, the first and second channels are substantially concave from a radially outer perspective.

In a further non-limiting embodiment of any of the foregoing gas turbine engines, bases of the first and second channels are defined by respective radii having origins on a centerline of a respective one of the first channel and the second channel.

In a further non-limiting embodiment of any of the foregoing gas turbine engines, a base of the second channel includes a raised center section and first and second concave pockets on opposite axial sides of the raised center section.

A cover configured to cover substantially an entire end of a rotatable shaft of a gas turbine engine according to an exemplary aspect of this disclosure includes, among other things, a passageway fluidly coupled from a first side of the cover to a second side of the cover, and a fin configured to prevent oil from entering the passageway.

In a further non-limiting embodiment of the foregoing cover, the cover includes a hub projecting from a wall, the passageway includes an axial section extending into the hub along an axis, and the passageway includes a plurality of radial sections formed in the hub and extending in a direction substantially perpendicular to the axis between the axial section and an outer diameter of the hub.

In a further non-limiting embodiment of any of the foregoing covers, the outer diameter of the hub provides the fin, and the outer diameter of the hub adjacent the fin has a greater radial dimension than the outer diameter of the hub adjacent the plurality of radial sections.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
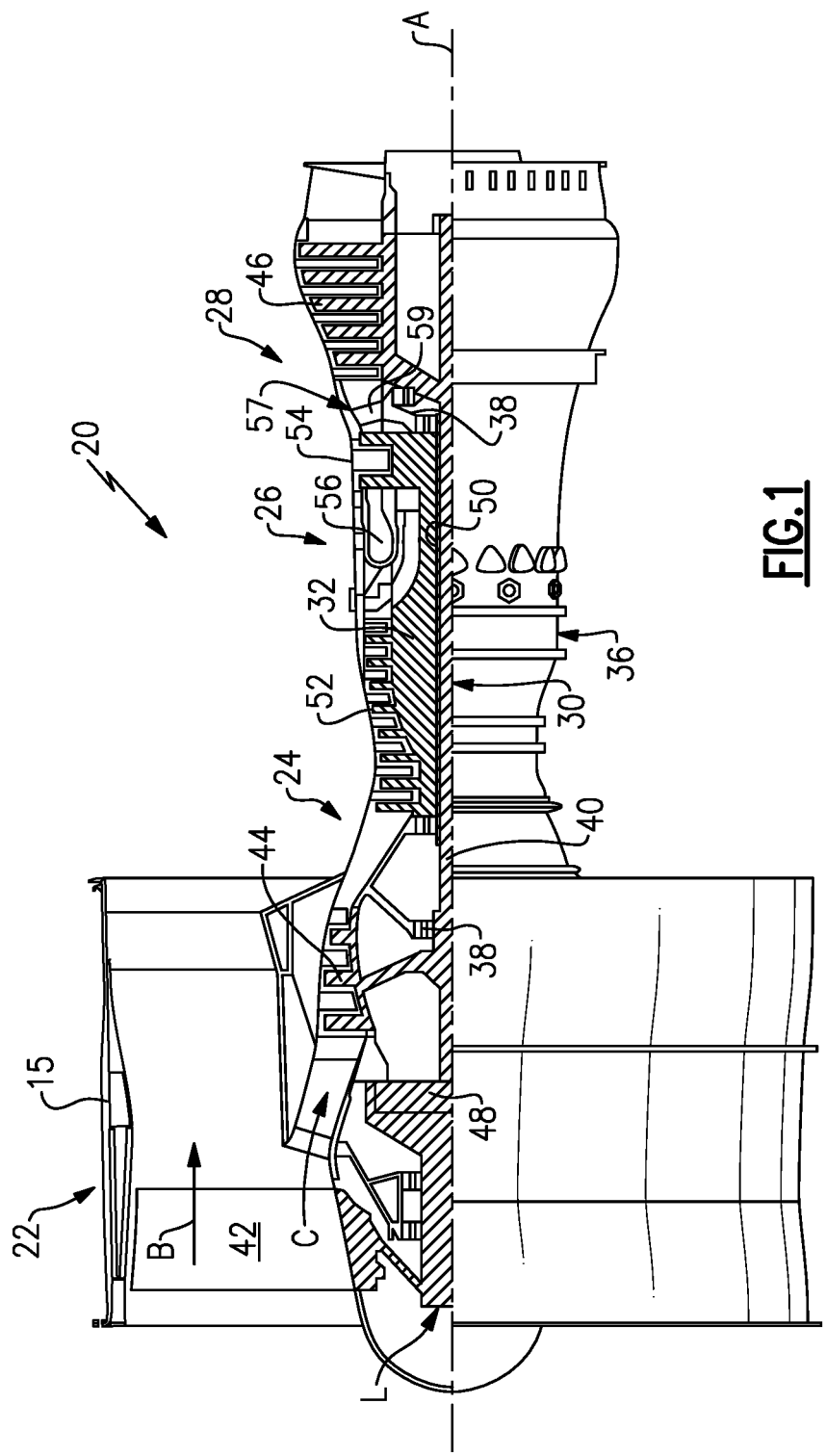
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans, low bypass engines, and multi-stage fan engines.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150 ft/second (350.5 meters/second).

Figure 2:
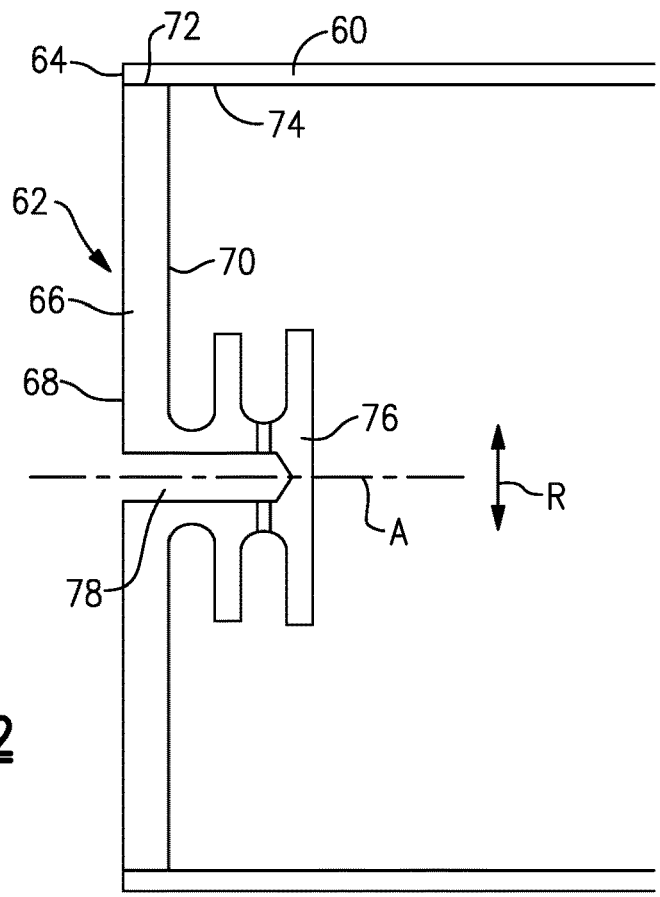
FIG. 2 illustrates a portion of the engine, and in particular illustrates a rotatable shaft and a cover.

FIG. 2 is a cross-sectional view of a portion of the engine 20, and illustrates an end portion of a shaft 60 of the engine 20. The shaft 60 is rotatable about the engine central longitudinal axis A. The shaft 60 may be a fan shaft in one example. In that example, FIG. 2 is representative a portion of the engine 20 at location L in FIG. 1. The shaft 60 may be operatively connected to the low speed spool 30 via the geared architecture 48. While the shaft 60 may be a fan shaft, it should be understood that this disclosure applies to other shafts within the engine 20, especially those where it is beneficial to vent air while retaining oil therein.

The shaft 60 is hollow in this example and is configured to communicate an air-oil mixture therein to feed oil to various locations, such as locations of bearing assemblies, within the engine 20. During use, air is sometimes vented in or out of the shaft 60 to maintain pressure differentials required to manage the flow of air within the engine 20. In this disclosure, a cover 62 is arranged relative to the end 64 of the shaft 60, and the cover 62 is configured to permit venting of air while substantially retaining oil within the shaft 60.

In this disclosure, the cover 62 substantially covers the end 64 of the shaft 60. The cover 62 is arranged about the engine central longitudinal axis A and is concentric with the shaft 60 in this example. The cover 62 includes a wall 66 having an outer surface 68 facing outside the shaft 60 and an inner surface 70 facing inside the shaft 60. The wall 66 is substantially circular in this example and is configured to fit within the substantially cylindrical shaft 60. Specifically, the wall 66 includes a radially outer diameter 72 in direct contact with a radially inner diameter 74 of the shaft 60. The term "radially" is used with reference to the radial direction R, which is normal to the engine central longitudinal axis A. The cover 62 is connected to the shaft 60 such that the cover 62 is configured to rotate with the shaft 60. While not shown, a snap ring or other engagement feature may be present between the radially outer diameter 72 of the wall 66 and the radially inner diameter 74 of the shaft 60.

The outer surface 68 of the cover 62 in this example is coterminous (i.e., flush) with the end 64 of the shaft 60. To this end, the cover 62 may be referred to as a plug. The outer surface 68 need not be coterminous with the end 64 of the shaft 60 in all examples, however.

The cover 62 is arranged to permit a relatively small amount of air to vent in and out of the shaft 60 while substantially preventing the egress of oil from the shaft 60. In particular, the cover 62 includes a fin configured to prevent the egress of oil from the shaft 60. The fin, in this example, is arranged on a hub. An example hub arrangement will now be described.

The cover 62 includes a hub 76 projecting axially from the inner surface 70 of the wall 66 and into the inside of the shaft 60. The hub 76 is integrally formed with the wall 66 such that the cover 62 is a one-piece component, in this example. The cover 62 includes a passageway 78 configured to permit a relatively small amount of air to vent in and out of the shaft 60. The hub 76 is configured to substantially prevent oil from entering the passageway 78. In general, the passageway 78 includes an axial section 94 (labeled in FIG. 3) and a plurality of radial sections 96 (labeled in FIG. 3). The detail of the hub 76 will now be described.

Figure 3:
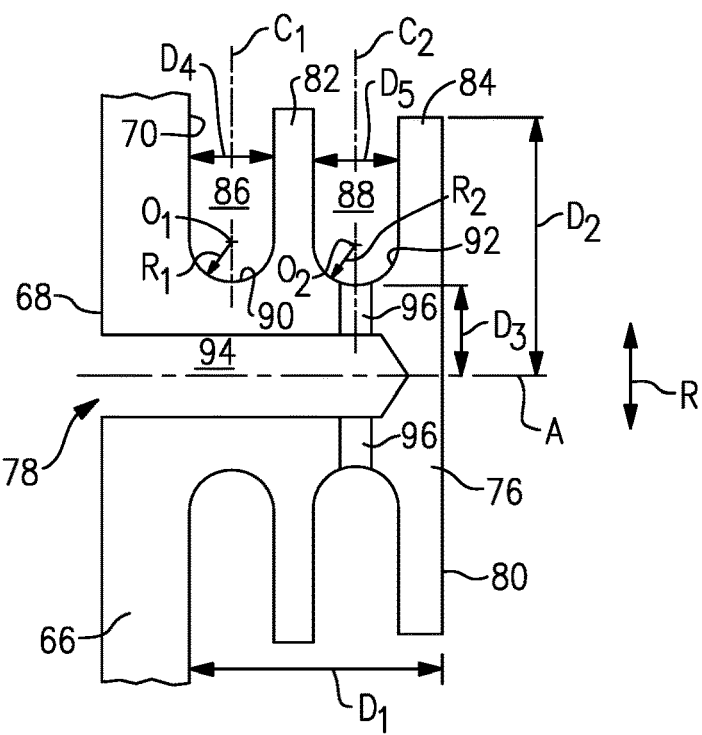
FIG. 3 illustrates a portion of a first embodiment of the cover.

With reference to FIG. 3, the hub 76 projects an axial distance $D_1$ from the inner surface 70 to an axial end 80 thereof. The hub 76 is concentric with the engine central longitudinal axis A and has a variable outer diameter. In this example, the outer diameter of the hub 76 varies between a maximum radial dimension $D_2$ and a minimum radial dimension $D_3$. The radial dimensions are measured relative to the engine central longitudinal axis A in this example.

The variable outer diameter of the hub 76 provides at least one fin. In this example, the outer diameter of the hub 76 provides a first fin 82 and a second fin 84. The first and second fins 82, 84 are circumferentially continuous and extend around the entire circumference of the hub 76. Radial ends of the first and second fins 82, 84 are spaced-apart from the engine central longitudinal axis A by the maximum radial dimension $D_2$.

The first fin 82 is spaced-apart axially from the inner surface 70 by a first channel 86, and the second fin 84 is spaced-apart axially from the first fin 82 by a second channel 88. The first and second channels 86, 88 are substantially concave when viewed from a radially outer perspective and are substantially U-shaped, in this example. The first and second channels 86, 88 extend around the entire circumference of the hub 76, and may be formed using known machining techniques.

In the example of FIG. 3, the first channel 86 is symmetrical about a radially-extending centerline $C_1$. Beginning at a base 90 of the first channel 86, the first channel 86 begins along the centerline $C_1$ at the minimum radial dimension $D_3$ of the hub 76 and is defined by a curve having a radius $R_1$ extending from an origin $O_1$ on the centerline $C_1$. The origin $O_1$ is within the first channel 86 and is spaced-apart from the minimum radial dimension $D_3$ by a distance equal to the radius $R_1$. The base 90 follows the radius $R_1$ until the base forms a substantially half-circle. The remainder of the first channel 86 exhibits an axial dimension $D_4$ which in this example is equal to twice $R_1$. The dimension $D_4$ is defined between the inner surface 70 and the first fin 82, which project substantially parallel to one another to define the dimension $D_4$. The first channel 86 exhibits the dimension $D_4$ radially from the origin $O_1$ to the maximum radial dimension $D_2$.

In the example of FIG. 3, the second channel 88 exhibits substantially the same contour as the first channel 86. Specifically, the second channel 88 is symmetrical about a radially-extending centerline $C_2$, exhibits a curved base 92 beginning on the centerline $C_2$ at the minimum radial dimension $D_3$ and following a radius $R_2$ extending from an origin $O_2$ on the centerline $C_2$. The base 92 blends into an axial dimension $D_5$, which is twice $R_2$ in this example, and is defined between the first fin 82 and the second fin 84 radially between the origin $O_2$ and the maximum radial dimension $D_2$.

The passageway 78 is fluidly coupled from outside the shaft 60 (i.e., left of the cover 62 in FIG. 2) to inside the shaft (i.e., right of the cover 62 in FIG. 2). With reference to FIG. 3, the passageway 78 includes an axial section 94 extending along the engine central longitudinal axis A from the outer surface 68 to a location within the hub 76. The axial section 94 may be a substantially cylindrical bore, in one example. Specifically, in the example of FIG. 3, the axial section 94 does not extend through the hub 76. Rather, the axial section 94 is covered axially by the end 80 of the hub 76.

The passageway 78 is fluidly coupled to the inside of the shaft 60 in this example by a plurality of radial sections 96 extending in a direction substantially perpendicular to the engine central longitudinal axis A between the axial section 94 and an outer diameter of the hub 76. In this example the radial sections 96 are substantially cylindrically-shaped holes having centerlines along the centerline $C_2$. The radial sections 96 intersect with the outer diameter of the hub 76 at the minimum radial dimension $D_3$ in the embodiment of FIG. 3. The minimum radial dimension $D_3$ is on the centerline $C_2$.

The arrangement of FIG. 3 substantially prevents oil from entering into the passageway 78. In particular, a majority of oil within the shaft 60 coming into contact with the cover 62 will contact the wall 66. By providing the first fin 82 axially between the radial sections 96 of the passageway 78 and the inner surface 70, the first fin 82 prevents oil that has entered the first channel 86 from entering the passageway 78. Oil within the first channel 86 adheres to the inner surface 70 and first fin 82 and is expelled radially outwardly under centrifugal force brought about by rotation of the shaft 60. To this end, the hub 76 may only include one fin (e.g., the first fin 82) in some examples.

The arrangement of FIG. 3 prevents oil from entering the second channel 88, as, again, most oil within the shaft 60 that approaches the cover 62 will contact the wall 66 and will be blocked from entering the second channel 88 by the first fin 82. The second fin 84 also blocks a substantial amount of oil from entering the second channel 88. Any minimal amount of oil that does enter the second channel 88 is substantially prevented from entering the passageway 78. Specifically, the arrangement of FIG. 3 is such that most if not all oil entering the second channel 88 adheres to either the first or second fins 82, 84 and is forced radially away from the radial sections 96 under the centrifugal force caused by rotation of the shaft 60 before the oil can reach the radial sections 96 of the passageway 78.

Figure 4:
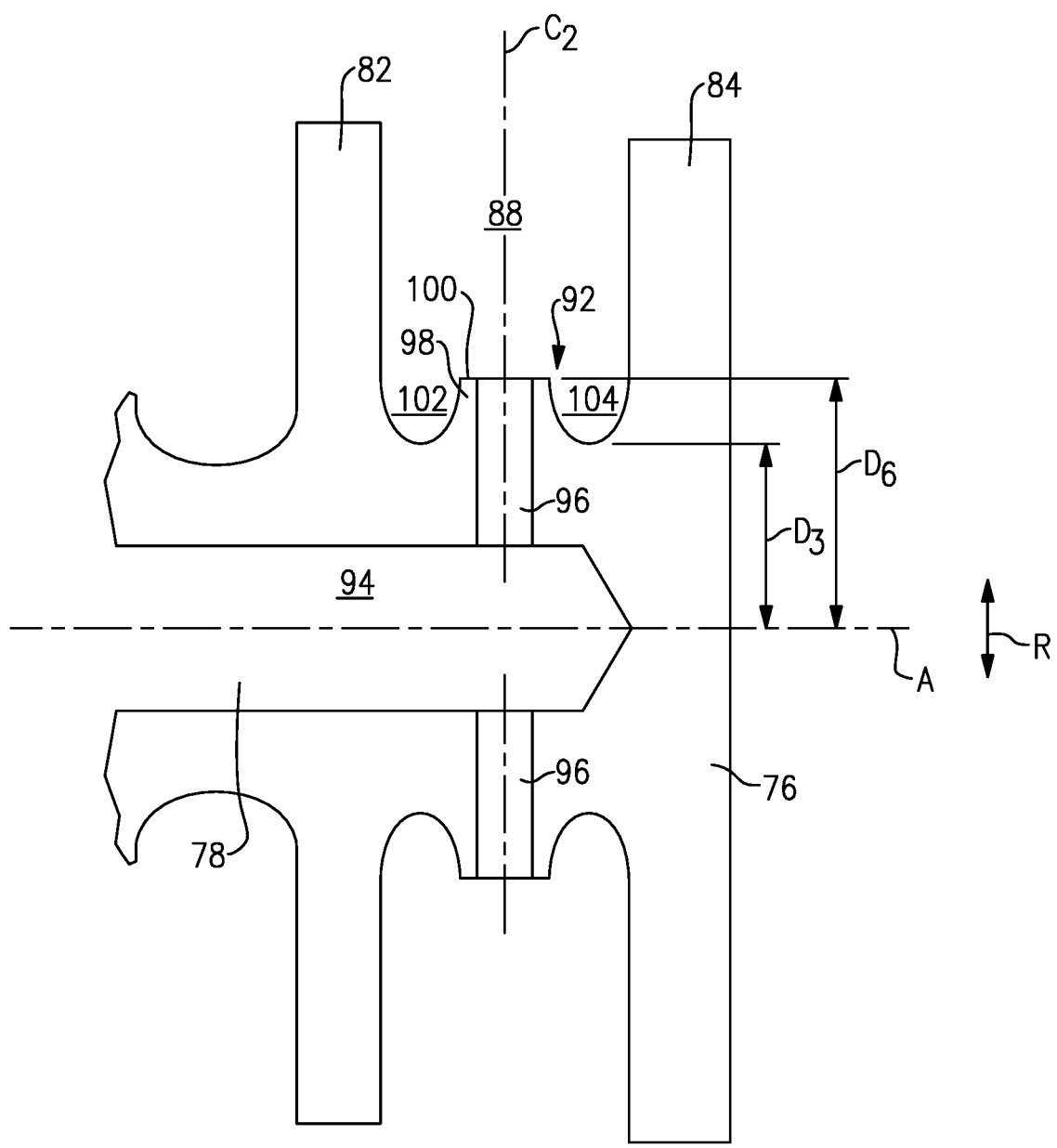
FIG. 4 illustrates a portion of a second embodiment of the cover.

FIG. 4 illustrates an alternate arrangement of the second channel 88. In FIG. 4, a base 92 includes a raised center section 98 between the first fin 82 and the second fin 84. The raised center section 98 projects into the second channel 88 from the minimum radial dimension $D_3$ to an end 100 at a radial dimension $D_6$, which is greater than $D_3$ and less than $D_2$. The end 100 is substantially flat and extends in a direction parallel to the engine central longitudinal axis A.

The raised center section 98 is bisected by the centerline C₂ of the second channel 88 in this example. On opposite axial sides of the raised center section 98, the hub 76 is shaped such that the second channel 88 has two concave pockets 102, 104. Moving axially away from the raised center section 98, the hub 76 is curved and extends radially inward to the minimum radial dimension $D_3$ and then ultimately to a respective one of the first and second fins 82, 84 to define the pockets 102, 104.

In the embodiment of FIG. 4, the radial sections 96 of the passageway 78 extend from the axial section 94 through the end 100 of the raised center section 98. In this way, the minimum radial dimension $D_3$ of the hub 76 is spaced-apart axially from the centerline $C_2$ and from the radial sections 96. In some situations, arrangement of FIG. 4 may further deter and prevent the egress of oil into the radial sections 96.

It should be understood that terms such as "axial," "radial," and "circumferential" are used above with reference to the normal operational attitude of the engine 20. Further, these terms have been used herein for purposes of explanation, and should not be considered otherwise limiting. Terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A cover configured to cover substantially an entire end of a rotatable shaft of a gas turbine engine, comprising:
   a passageway fluidly coupled from a first side of the cover to a second side of the cover; and
   a fin configured to prevent oil from entering the passageway;
   wherein the cover includes a hub projecting from a wall,
   wherein the passageway includes an axial section extending into the hub along an axis, and
   wherein the passageway includes a plurality of radial sections formed in the hub and extending in a direction substantially perpendicular to the axis between the axial section and an outer diameter of the hub,
   wherein the outer diameter of the hub provides the fin,
   wherein the outer diameter of the hub adjacent the fin has a greater radial dimension than the outer diameter of the hub adjacent the plurality of radial sections,
   wherein the fin is axially between the plurality of radial sections and the inner surface of the wall,
   wherein the fin is a first fin and the hub further includes a second fin,
   wherein the radial sections are axially between the first and second fins,
   wherein the outer diameter of the hub provides a first channel between the first fin and the inner surface of the wall and a second channel between the first and second fins,
   wherein the first and second channels are substantially concave from a radially outer perspective, and
   wherein bases of the first and second channels are defined by respective radii having origins on a centerline of a respective one of the first channel and the second channel.

2. A gas turbine engine, comprising:
   a rotatable shaft; and
   a cover substantially covering an end of the rotatable shaft, the cover including a passageway fluidly coupled from outside the rotatable shaft to inside the rotatable shaft, the cover further including a fin configured to prevent oil from entering the passageway,
   wherein the cover includes a wall covering substantially the entire end of the rotatable shaft,
   wherein the wall includes an outer surface facing outside the rotatable shaft and an inner surface facing inside the rotatable shaft,
   wherein the cover includes a hub projecting from the inner surface of the wall,
   wherein the passageway includes an axial section extending along an engine central longitudinal axis from the outer surface to a location within the hub,
   wherein the passageway includes a plurality of radial sections extending in a direction substantially perpendicular to the engine central longitudinal axis between the axial section and an outer diameter of the hub,
   wherein the outer diameter of the hub provides the fin,
   wherein the outer diameter of the hub adjacent the fin has a greater radial dimension than the outer diameter of the hub adjacent the plurality of radial sections,
   wherein the fin is axially between the plurality of radial sections and the inner surface of the wall,
   wherein the fin is a first fin and the hub further includes a second fin,
   wherein the radial sections are axially between the first and second fins,
   wherein the outer diameter of the hub provides a first channel between the first fin and the inner surface of the wall and a second channel between the first and second fins,
   wherein the first and second channels are substantially concave from a radially outer perspective, and
   wherein bases of the first and second channels are defined by respective radii having origins on a centerline of a respective one of the first channel and the second channel.

3. A gas turbine engine, comprising:
   a rotatable shaft; and
   a cover substantially covering an end of the rotatable shaft, the cover including a passageway fluidly coupled from outside the rotatable shaft to inside the rotatable shaft, the cover further including a fin configured to prevent oil from entering the passageway,
   wherein the cover includes a wall covering substantially the entire end of the rotatable shaft,
   wherein the wall includes an outer surface facing outside the rotatable shaft and an inner surface facing inside the rotatable shaft,
   wherein the cover includes a hub projecting from the inner surface of the wall, wherein the passageway includes an axial section extending along an engine central longitudinal axis from the outer surface to a location within the hub, wherein the passageway includes a plurality of radial sections extending in a direction substantially perpendicular to the engine central longitudinal axis between the axial section and an outer diameter of the hub, wherein the outer diameter of the hub provides the fin, wherein the outer diameter of the hub adjacent the fin has a greater radial dimension than the outer diameter of the hub adjacent the plurality of radial sections, wherein the fin is axially between the plurality of radial sections and the inner surface of the wall, wherein the fin is a first fin and the hub further includes a second fin, wherein the radial sections are axially between the first and second fins, wherein the outer diameter of the hub provides a first channel between the first fin and the inner surface of the wall and a second channel between the first and second fins, wherein centerlines of the radial sections are concentric with a centerline of the second channel, and wherein the second channel includes a raised center section such that a minimum radial dimension of the outer diameter of the hub is spaced-apart from the centerline of the second channel.

4. The gas turbine engine as recited in claim 3, wherein the hub is concentric with an engine central longitudinal axis.

\* \* \* \* \*